United States Patent
Nishimura et al.

(10) Patent No.: US 6,298,533 B1
(45) Date of Patent: Oct. 9, 2001

(54) ASSEMBLING DEVICE FOR DISC CARTRIDGE

(75) Inventors: Kimitaka Nishimura; Kenichi Kano; Takahiko Fukushima, all of Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/449,629

(22) Filed: Nov. 30, 1999

(30) Foreign Application Priority Data

Dec. 2, 1998 (JP) .................................................. 10-343199

(51) Int. Cl.⁷ .................................................. B23P 11/00
(52) U.S. Cl. .................................. 29/243.5; 29/243.517; 29/243.54; 29/243.519; 29/243.523
(58) Field of Search ........................ 29/243.519, 243.521, 29/243.523, 243.53, 243.54, 243.517

(56) References Cited

U.S. PATENT DOCUMENTS

| | | | |
|---|---|---|---|
| 4,970,618 | 11/1990 | Kato et al. ............................. | 360/133 |
| 5,227,173 | * 7/1993 | Sherwood ............................. | 29/243.5 |
| 5,291,644 | * 3/1994 | Musil ................................... | 29/243.5 |
| 5,362,172 | 11/1994 | Hubbling ............................. | 403/282 |
| 6,092,270 | * 8/2000 | Sawdon ............................... | 29/243.5 |
| 6,099,291 | * 8/2000 | Lanser ................................. | 29/243.5 |

* cited by examiner

Primary Examiner—Joseph J. Hail, III
Assistant Examiner—Lee Wilson
(74) Attorney, Agent, or Firm—Ronald P. Kananen; Rader, Fishman & Grauer

(57) ABSTRACT

A disc cartridge assembling apparatus in which a protuberance formed on the inner surface of one of cartridge halves of a thermoplastic resin making up a main cartridge body unit is passed through a through-hole formed in the other cartridge half in register with the protuberance, and in which the distal end of the protuberance is thermally deformed to interconnect the cartridge halves. The upper and lower cartridge halves are stacked together, with a protuberance formed on the upper cartridge half being passed through the through-hole formed in the upper cartridge half, and are held by a holding mechanism. In this state, the distal end of the protuberance is thermally deformed by a caulking head, heated by a heater, and which is provided with a recess in its surface adapted to compress against the protuberance. Then, as the caulking head is moved away from the thermally deformed protuberance, the caulking head and the protuberance are cooled by a cooling mechanism. This effectively shortens the caulking process since the thermal deformation of the protuberance until the solidification.

6 Claims, 10 Drawing Sheets

ASSEMBLING DEVICE FOR DISC CARTRIDGE

BACKGROUND OF THE INVENTION

1. Field of the Invention

This invention relates to an assembling device for a disc cartridge housing a disc such as a magnetic disc or an optical disc used as an information recording medium. More particularly, it relates to an assembling device used for assembling a pair of cartridge halves making up a main cartridge body unit of the disc cartridge.

2. Description of the Related Art

Conventionally, a disc cartridge, housing therein a disc, such as a magnetic disc or an optical disc, used as an information recording medium, is comprised of a main cartridge body unit, obtained on abutting and interconnecting paired upper and lower cartridge halves, formed by injection molding a thermoplastic synthetic resin, and a disc rotationally housed within the main cartridge body unit.

As shown in FIGS. 1(A) to 1(C), on each corner of an inner surface of the upper cartridge half 101 of the main cartridge body unit, housing the disc therein, there is formed a protuberance 103 for coupling the upper cartridge half 101 to a lower cartridge half 102 constituting a main cartridge body unit along with the upper cartridge half 101, as shown in FIGS. 1A to 1C. In each corner of the lower cartridge half 102 is formed a through-hole 104 passed through by the protuberance 103. The upper and lower cartridge halves 101, 102 are interconnected by inserting a disc in the upper cartridge half 101, passing the protuberance 103 through the through-hole 104 to attach the lower cartridge half 102 to the upper cartridge half 101 and thermally caulking a distal end 103a of the protuberance 103 protruded from the through-hole 104.

An assembling device for a disc cartridge, obtained on interconnecting the upper cartridge half 101 and the lower cartridge half 102, includes a thermal caulking head 111 for thermally deforming the protuberance 103, as shown in FIG. 1A. The thermal caulking head 111 has its distal end face recessed substantially hemi-arcuately to form a recess 112, and an abutment 113 for compressing against the lower cartridge half 102 is formed around the recess 112. The thermal caulking head 111 is heated to a temperature which thermally deforms the synthetic resin. With the caulking head 111 in the heated state, the assembling device for a disc cartridge is moved in a direction approaching to the protuberance 103, as shown in FIG. 1B, until the abutment 113 compresses against the outer surface of the lower cartridge half 102. The distal end 103a of the protuberance 103 is thrust by the recess 112, at the same time as it is thermally deformed, so that it is deformed to a semicircular cross-sectional shape after the shape of the recess 112. The deformed distal end 103a becomes larger in diameter than the through-hole 104 to form a retainer 106 which prohibits detachment of the protuberance 103 from the through-hole 104. The caulking head 111 then is moved in a direction away from the lower cartridge half 102, as shown in FIG. 1C, to allow the distal end 103a of the thermally deformed protuberance 103 to be cooled and solidified spontaneously to interconnect the lower cartridge half 102 and the upper cartridge half 103.

Meanwhile, for thermal caulking, the caulking head 111 needs to be heated to a temperature allowing for thermal deformation. In addition, the heated caulking head 111 needs to be cooled to a moderate temperature. Thus, the caulking process is timeconsuming to render it difficult to improve the disc cartridge production efficiency. Should it be attempted to reduce the time needed for caulking, the caulking head 111 cannot be heated sufficiently, with the result that the protuberance 103 formed of the thermoplastic resin cannot be deformed thermally sufficiently. Thus, the distal end 103a of the protuberance 103 cannot be thermally deformed sufficiently, with the result that a sufficient coupling force to interconnect the upper and lower cartridge halves cannot be developed such that the upper and lower cartridge halves 101, 102 tend to be readily detached from each other after assembling.

SUMMARY OF THE INVENTION

It is therefore an object of the present invention to provide an assembling device for a disc cartridge whereby paired cartridge halves can be interconnected reliably in a shorter time without the risk of detachment following assembling and whereby the disc housed in the main cartridge body unit can be protected reliably.

The present invention provides a disc cartridge assembling apparatus in which a protuberance formed on the inner surface of one of cartridge halves of a thermoplastic resin making up a main cartridge body unit is passed through a through-hole formed in the other cartridge half in register with said protuberance and in which the distal end of the protuberance is thermally deformed to interconnect the cartridge halves. The disc cartridge assembling apparatus includes a holding mechanism for holding the cartridge halves so that, with the cartridge half formed with the protuberance being placed below the other cartridge half, the other cartridge half is mounted on the cartridge half formed with the protuberance by passing the protuberance through the through-hole, and for holding the upper and lower cartridge halves together in this state. The disc cartridge assembling apparatus also includes a caulking head having a recess on a surface thereof abutted against the protuberance. The caulking head encloses a heating mechanism, and is adapted to compress against the distal end of the protuberance of the cartridge half exposed through the through-hole of the other cartridge half. The disc cartridge assembling apparatus also includes a movement mechanism for thrusting the caulking head, heated to a temperature capable of thermally deforming the thermoplastic resin, against the distal end of the protuberance to deform the protuberance and for moving the caulking head away from the protuberance, and a cooling mechanism for cooling the caulking head.

In order that the protuberance formed on one of the cartridge halves will be thermally deformed by heating it quickly, a projection is formed on a recessed portion formed on a surface of the caulking head adapted to compress against the protuberance. By providing this projection, a contact area of the caulking head with the protuberance is increased to assure quick thermal deformation of the protuberance.

In the assembling device of the present invention, if the protuberance formed on one of the cartridge halves is thermally deformed by the caulking head, the distal end of the protuberance is enlarged in diameter to form a retainer, at the same time as a recessed portion is formed by the projection at the center of the retainer. Thermal caulking by this caulking head improves the thermal conduction efficiency to shorten the time required for thermal caulking. On the other hand, the caulking head is cooled by the cooling mechanism when the head is moved away from the thermally deformed protuberance, thus further shortening the time needed from thermal deformation of the protuberance until its cooling.

Since the cooling mechanism used for this assembling device effects cooling using a gaseous cooling medium, a flow duct is provided in the caulking head, while there is provided a blowout port directed towards the caulked portion.

Other objects and advantages of the present invention will become more apparent from the following description of the preferred embodiment of the invention and the claims.

BRIEF DESCRIPTION OF THE DRAWINGS

FIGS.1(A) to 1(C) show the relative position between a thermal caulking head and a protuberance in a conventional practice, wherein FIG. 1(A) is a cross-sectional view showing the state in which the thermal caulking head is detached from the protuberance, FIG. 1(B) is a cross-sectional view showing the protuberance being thermally deformed by the thermal caulking head and FIG. 1(C) is a cross-sectional view showing the state in which the caulking by the thermal caulking head is terminated and the protuberance is deformed.

FIGS.4(A) to 4(C) show the relative position between a thermal caulking head of the assembling device and a protuberance, wherein FIG. 4(A) is a cross-sectional view of the thermal caulking head, FIG. 4(B) is a plan view of the thermal caulking head and FIG. 4(C) is a cross-sectional view of a protuberance set on the upper cartridge half.

FIGS.7(A) to 7(C) show the relative position between the thermal caulking head and the protuberance, wherein FIG. 7(A) is a cross-sectional view showing the state in which the thermal caulking head is detached from the protuberance, FIG. 7(B) is a cross-sectional view showing the state of thermal deformation of the protuberance by the thermal caulking head and FIG. 7(C) is a cross-sectional view showing the state in which caulking by the thermal caulking head is terminated and the protuberance in the deformed state.

DESCRIPTION OF THE PREFERRED EMBODIMENTS

Figure 1A:
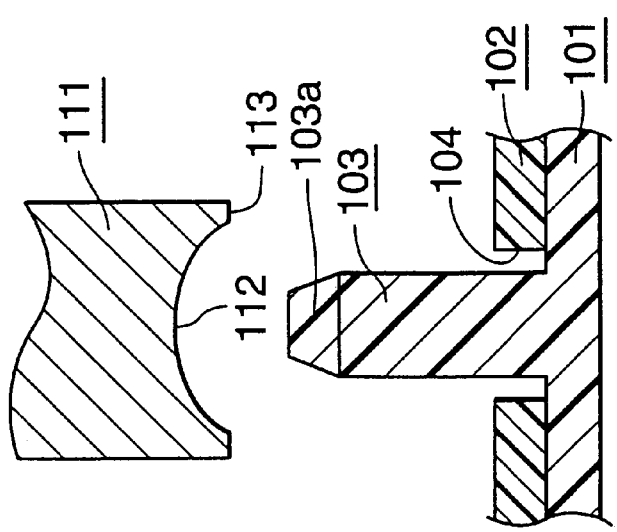

Referring to the drawings, preferred embodiments of a disc cartridge assembling device according to the present invention will be explained in detail. This disc cartridge assembling device is used for interconnecting upper and lower cartridge halves constituting a main cartridge body unit rotationally housing a magnetic disc of a disc cartridge therein.

Before proceeding to the description of the disc cartridge assembling device, a disc cartridge, having a main cartridge body unit, upper and lower cartridge halves of which are interconnected by this assembling device, is explained.

Figure 2:
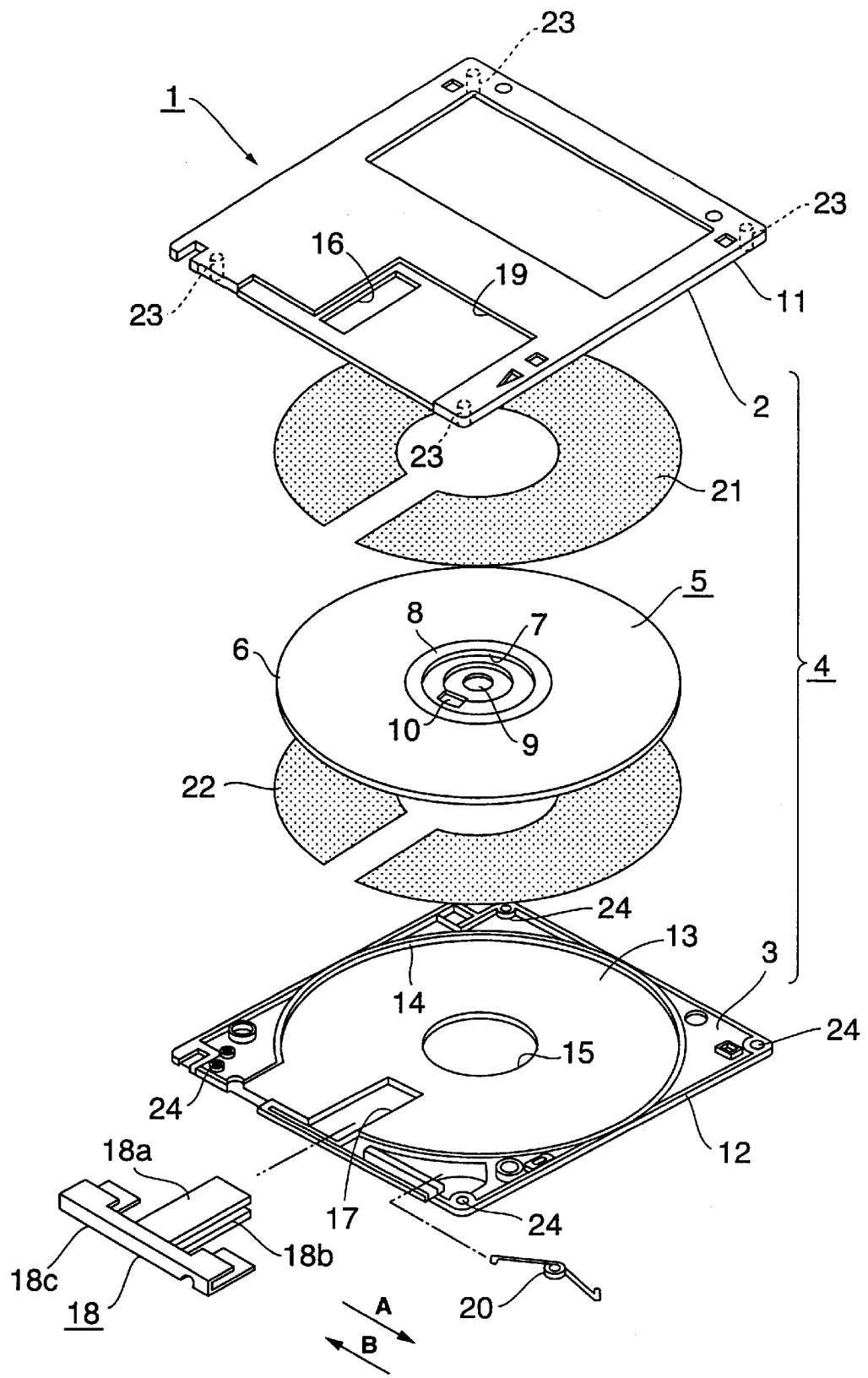
FIG. 2 is an exploded perspective view showing an example of a disc cartridge assembled by the assembling device of the present invention.

Referring to FIG. 2, the disc cartridge 1 includes a main cartridge body unit 4, obtained on abutting and interconnecting upper and lower cartridge halves 2, 3, each formed to a substantially rectangular profile by injection molding of synthetic resin, and a magnetic disc 5 housed in the main cartridge body unit 4 for recording information signals thereon, as shown in FIG. 2. This magnetic disc 5 has a main disc member 6, with a diameter of 3.5 inch, having a magnetic layer deposited on each major surface of a thin flexible film. The main disc member 6 has a center aperture 7 and a center core 8 mounted thereon as by fitting in the center aperture 7. The center core 8 is formed of a magnetic material, such as metal, so that it is magnetically attracted by a magnet arranged on a disc rotating driving unit mounted on a disc recording and/or reproducing apparatus when the magnetic disc 5 is loaded thereon. In the center core 8 are bored a spindle shaft insertion opening 9, passed through by a spindle shaft of the disc rotating driving unit, and a driving pin engagement opening 10 engaged by a driving pin provided on the disc rotating driving unit.

The main cartridge body unit 4, rotationally housing therein the magnetic disc 5, as described above, is formed by abutting and interconnecting an upper cartridge half 2 and a lower cartridge half 3, each formed to a substantially rectangular shape from a synthetic resin, such as polycarbonate or ABS resin. On the inner surfaces of the upper and lower cartridge halves 2, 3 there is formed a partitioning wall 14, constituting a disc housing section 13 housing a magnetic disc 5, and which inscribes upstanding peripheral wall sections 11, 12 formed on the outer rims of the upper and lower cartridge halves 2, 3, respectively.

In a mid portion of the lower cartridge half 3, constituting the lower surface of the main cartridge body unit 4, there is formed a circular center aperture 15 for exposing the center core 8 mounted on the magnetic disc 5 housed in the main cartridge body unit 4 to outside, as shown in FIG. 2. In opposing positions of the upper and lower cartridge halves 2, 3 of the main cartridge body unit 4 are formed first and second recording and/or reproducing apertures 16, 17 adapted for exposing at least portions of the signal recording areas of the magnetic disc 5 housed in the main cartridge body unit 4 to outside along the radius of the disc 5, as shown in FIG. 2. These first and second recording and/or reproducing apertures 16, 17 are at a mid portion in the left-and-right direction of the main cartridge body unit 4, and are formed to a substantially rectangular form for extending from the vicinity of a center opening 15 to the vicinity of the front wall section of the main cartridge body unit 4. That is, the first and second recording and/or reproducing apertures 16, 17 are designed so that a magnetic head constituting the recording and/or reproducing mechanism intruded into the main cartridge body unit 4 via the first and second recording and/or reproducing apertures 16, 17 is able to scan the magnetic disc housed in the main cartridge body unit 4 across the inner and outer rims of the disc.

On the main cartridge body unit 4 is movably mounted a shutter member 18 adapted for opening and closing the first and second recording and/or reproducing apertures 16, 17, as shown in FIG. 2. The shutter member 18 is formed by punching and warping a thin metal sheet to a substantially U-shaped cross-section. The shutter member 18 includes a first shutter member 18a for opening/closing a first recording and/or reproducing aperture 16 formed in the upper cartridge half 2, a second shutter member 18b for opening/closing a second recording and/or reproducing aperture 17 formed in the lower surface of the disc cartridge, and a connecting portion 18c interconnecting the proximal portions of the first and second shutter members 18a, 18b so that the first and second shutter members 18a, 18b will be substantially parallel to each other. The connecting portion 18c has an inwardly directed engagement piece engaging in a guide groove formed along the front side of the upper and lower cartridge halves 2, 3 for guiding the movement of the shutter member 18.

The shutter member 18 formed in this manner is inserted from the front side so that the first and second shutter members 18a, 18b will be extended over the first and second recording and/or reproducing apertures 16, 17, and is mounted in a shutter movement recess 19 formed for extending from the rims of the first and second recording and/or reproducing apertures 16, 17 of the main cartridge body unit 4 to a lateral side of the main cartridge body unit 4. The shutter member 18, thus mounted on the front side of the main cartridge body unit 4, is moved in the direction indicated by arrows A and B in FIG. 2 between a position in which the first and second shutter portions 18a, 18b close the first and second recording and/or reproducing apertures 16, 17 and a position in which the first and second shutter portions 18a, 18b open the first and second recording and/or reproducing apertures 16, 17. Meanwhile, the shutter member 18, mounted on the main cartridge body unit 4, is biased by a coil spring 20 provided in the main cartridge body unit 4 in the direction indicated by arrow B in FIG. 2 for closing the first and second recording and/or reproducing apertures 16, 17.

The portions of the inner surfaces of the upper and lower cartridge halves 2, 3, confined by the partitioning wall section 13 of the disc housing section 14, is formed as a flat surface on which are arranged protective sheets 21, 22 adapted for protecting the magnetic disc 5. These protective sheets 21, 22 serve for wiping off dust and dirt affixed to the magnetic disc and to prevent the magnetic disc from directly contacting with the upper and lower cartridge halves 2, 3 in order to protect the magnetic disc 5. These protective sheets 21, 22 are formed of non-woven fabrics, such as felt sheet, or lubricating sheets.

On the corners on the inner surface of the upper cartridge half 2 are formed plural protuberances 23, for assembling the lower cartridge half 3. In the lower cartridge half 3, there are formed through-holes 24, in the respective corners in register with the protuberances 23. The upper and lower cartridge halves 2, 3 are coupled together by passing the protuberances 23 of the upper cartridge half 2 through the respective through-holes 24 of the lower cartridge half 3 and by thermally deforming the distal ends 23a of the protuberances 23 to complete the main cartridge body unit 4.

When the disc cartridge 1, constructed as described above, is loaded on the disc recording and/or reproducing apparatus, the shutter member 18 is moved by the shutter opening mechanism of the disc recording and/or reproducing apparatus in the direction indicated by arrow A in FIG. 2 to open the first and second recording and/or reproducing apertures 17, 19. The center core 8 of the main cartridge body unit 4 of the disc cartridge 1 exposed to outside via the center opening 15 is set on a disc table constituting the disc rotating driving unit of the disc recording and/or reproducing apparatus. The spindle shaft insertion opening 9 is passed through by a spindle shaft of the disc rotating driving unit. At this time, the center core 8 is set on the disc table and attracted by a magnet so that the magnetic disc 5 can now be rotated in unison with the disc table.

If, in a state in which the magnetic disc 5 is rotatable in unison with the disc table, the spindle motor of the disc rotating driving unit is driven to run the disc table in rotation, a driving pin of the disc rotating driving unit is engaged in the driving pin engagement opening 10 so that the magnetic disc 5 is positioned with respect to the spindle shaft and is run in rotation in synchronism with rotation of the disc table, about the spindle shaft as the center of rotation. The information signals are recorded and/or reproduced by the magnetic head.

Figure 3:
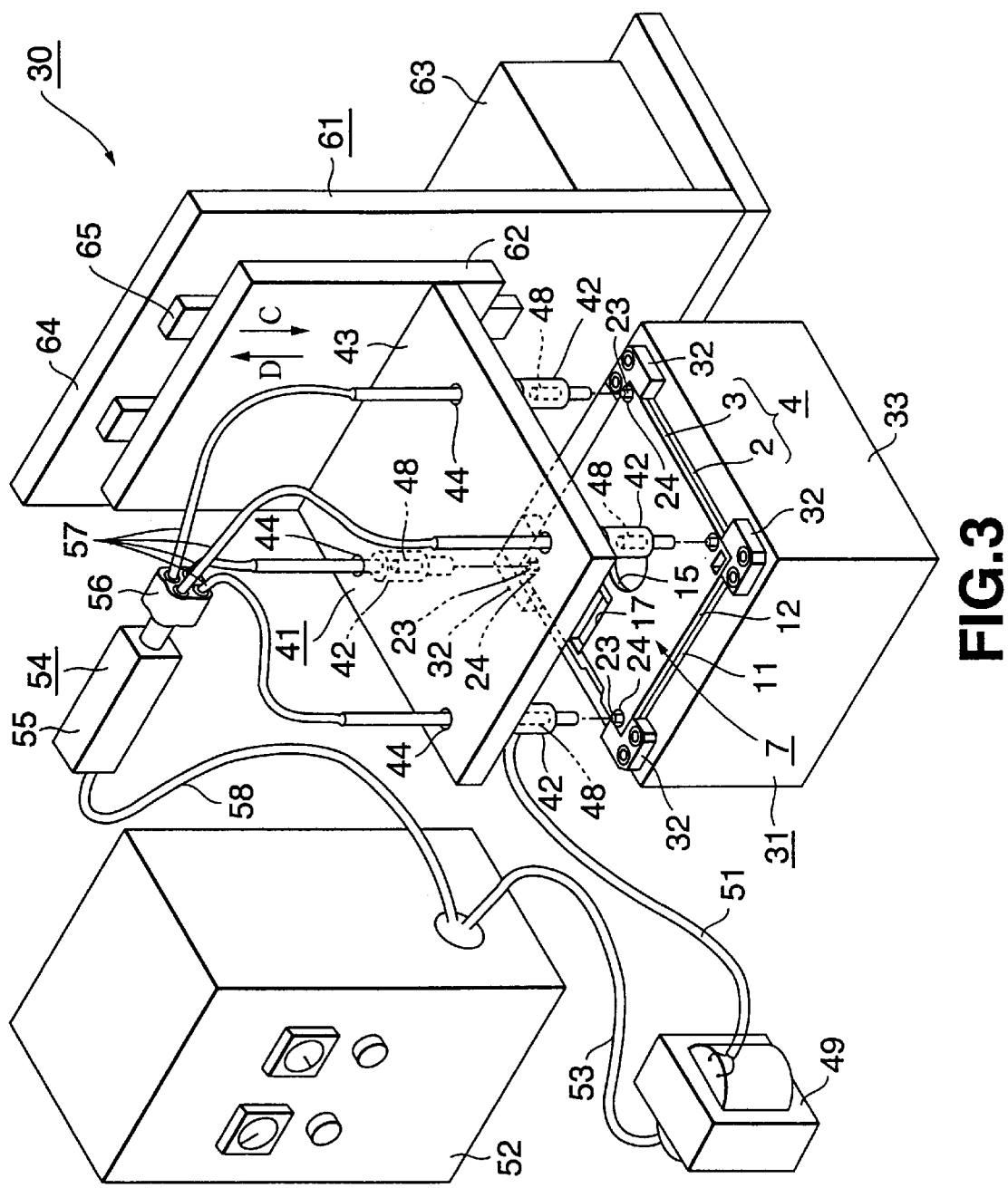
FIG. 3 shows an assembling device of the present invention.

As shown in FIG. 3, a disc cartridge assembling device 30, adapted for interconnecting upper and lower cartridge halves 2, 3, constituting the main cartridge body unit 4 of the disc cartridge 1 housing the magnetic disc 5, to complete assemblage of the main cartridge body unit 4, includes a holding mechanism 31, for holding the upper and lower cartridge halves 2, 3, as the plural protuberances 23 provided on the upper cartridge half 2 are inserted into the plural through-holes formed in the lower cartridge half 3, a thermal caulking head mechanism 41, for thermally deforming the distal ends 23a of the protuberances 23 for caulking the lower cartridge half 3 to the upper cartridge half 2, and a movement mechanism 61 for causing movement of the thermal caulking head mechanism 41 towards and away from the holding mechanism 31, as shown in FIG. 3. With this assembling device 30, a thermal caulking head 42, constituting the thermal caulking head mechanism 41, heated to a temperature sufficient to thermally deform the plural protuberances 23, formed as one with the upper cartridge half 2 of a thermoplastic resin, is applied against the distal ends of the respective protuberances 23 to deform the distal ends of the respective protuberances 23. The thermal caulking head mechanism 41 then is moved in a direction away from the respective protuberances 23. This connects the lower cartridge half 3 to the upper cartridge half 2.

The holding mechanism 31, holding the upper cartridge half 2 and the lower cartridge half 3 in a state in which each protuberance 23 is introduced into each through-hole 24, includes plural holding members 32 for holding the upper and lower cartridge halves 2, 3 on a base block 33 so that the upper cartridge half 2 is superposed on the lower cartridge half 3, as shown in FIG. 3. These holding members 32, arranged at four positions to hold the corners of the superposed upper and lower cartridge halves 2, 3, are of a thickness sufficient to hold the superposed upper and lower cartridge halves 2, 3, and are substantially L-shaped to support the corners of the upper and lower cartridge halves 2, 3 from outside.

The upper and lower cartridge halves 2, 3, superposed together by passing the protuberances 23 through the through-holes 24, are sequentially transferred by a transporting mechanism, not shown, so as to be held on the holding mechanism 31. When transported by the transporting mechanism, the protuberances 23 provided on the upper cartridge half 2 are projected upwards via the through-holes 24 bored in the lower cartridge half 3. When the distal ends 23a of the protuberances 23 are thermally deformed by the thermal caulking head mechanism 41 to interconnect the lower cartridge half 3 and the upper cartridge half 2, by way of performing the caulking, the transporting mechanism takes out the upper and lower cartridge halves 2, 3 (main cartridge body unit 4) from the holding mechanism 31 to transfer the upper and lower cartridge halves 2, 3, thus taken out, to the next step.

Figure 1B:
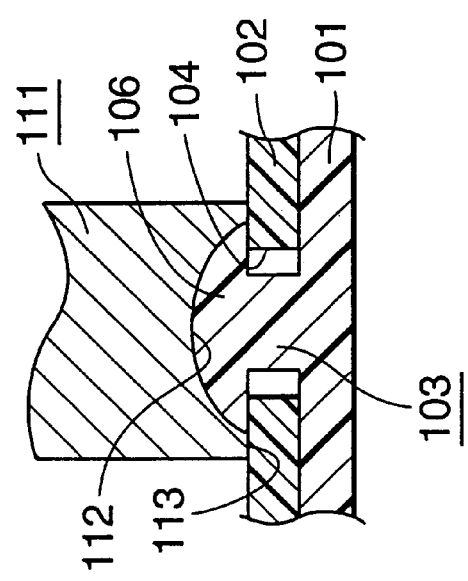
Figure 1C:
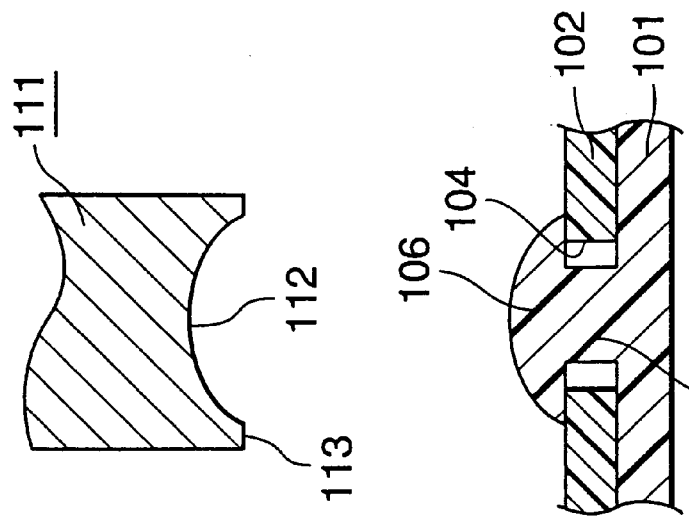

The thermal caulking head mechanism 41, thermally deforming the distal ends 23a of the protuberances 23 to caulk the lower cartridge half 3 to the upper cartridge half 2, includes a plurality of thermal caulking heads 42, for thermally deforming the protuberances 23 provided on the upper cartridge half 2, and a mounting plate 43 carrying the thermal caulking heads 42, as shown in FIG. 1. Each thermal caulking head 42 is mounted in position in association with each protuberance 23 by being passed through one of plural through-holes 44 bored in the respective corners of the mounting plate 43.

Figure 4A:
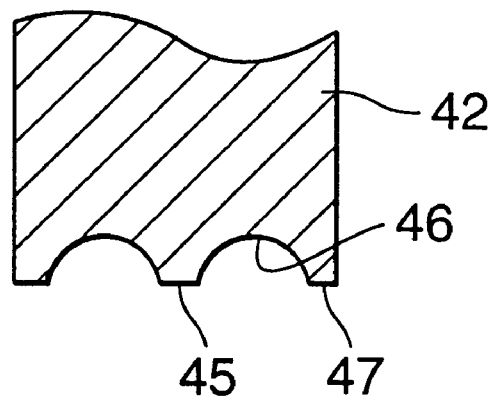
Figure 4B:
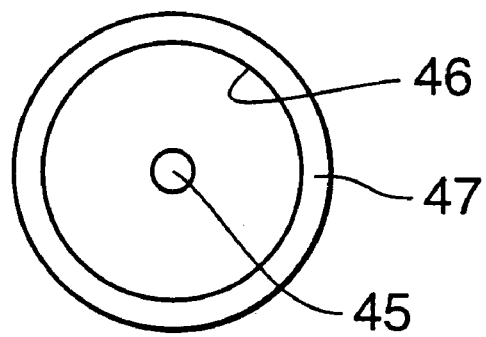
Figure 4C:
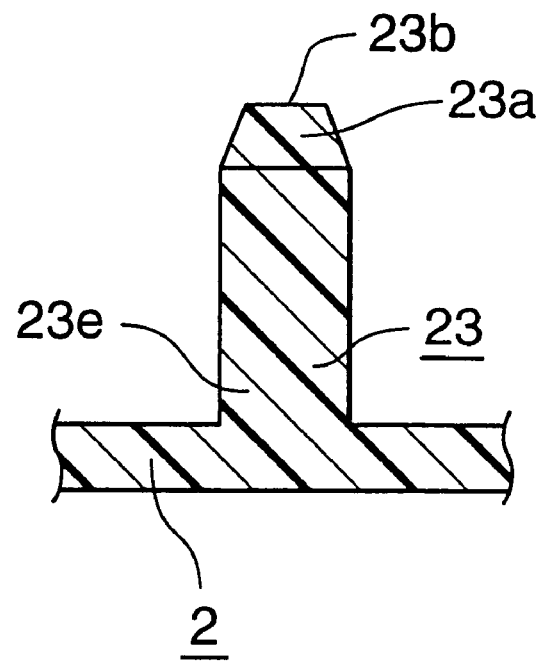

The protuberances 23, set on the corners on the inner surface of the upper cartridge half 2, thermally deformed by the thermal caulking heads 42, are each formed so that the distal end 23a is smaller in diameter than the proximal end, with the distal end 23a presenting a planar surface, as shown in FIG. 4(C). That is, the protuberance 23 is tapered towards the distal end 23a to reduce the time until the completion of thermal deformation, and is planar at the distal end face 23b to enable the thermal caulking head 42 to be abutted with a wide abutting surface against the distal end face 23b.

Each thermal caulking head 42 includes a projection 45, a recessed portion 46 of a semicircular cross-section, provided in continuation to the outer rim side of the projection 45, and a guide portion 47 provided in continuation to the recessed portion 46 to regulate the deformation of the thermally deformed protuberance 23, as shown in FIGS. 4(A) and 4(B). The projection 45 is arranged facing the end face 23b of the protuberance 23 to thrust the mid portion of the end face 23a of the protuberance 23.

The projection 45, provided at the center of the distal end of the thermal caulking head 42, has a planar end face, as shown in FIG. 4A, so that it can be positively contacted with a larger contact surface with the end face 23b of the protuberance 23. This projection 45 forms a retainer 23c by thermally deforming and thereby outwardly expanding the distal end 23a of the protuberance 23. The projection 45 also forms a recessed portion 23d at a mid portion of the retainer 23c, as shown in FIG. 7(C). When the protuberance 23 is thermally deformed by the thermal caulking head 42, a proximal end 23e thereof is also enlarged in diameter. When the distal end 23a of the protuberance 23 is thermally deformed, the projection 45 forms the recessed portion 23d in the distal end face 23b, thus raising the thermal conduction efficiency to the protuberance 23 for shortening the time necessary in thermal caulking.

The recessed portion 46, formed in continuation to the outer rim side of the projection 45, is of a diameter larger than the outside diameter of the protuberance 23 to permit insertion of the protuberance 23 therein. The surface portion of the recessed portion 46 abutted against the protuberance 23 is formed to a semicircular shape in order to permit the distal end face 23a of the thermally deformed protuberance 23 to be expanded towards the outer peripheral side and thermally deformed to a semicircular shape. The guide portion 47 formed on the outer rim side of the recessed portion 46 is abutted against the outer rim side of the through-hole 24 formed in the lower cartridge half 3. That is, the guide portion 47 is larger in diameter than the through-hole to control the deformation of the protuberance 23 so that the outer rim portion of the distal end 23a of the protuberance 23 is circular as the bulk of the protuberance 23 is expanded up to the outer rim of the through-hole 24. Since the protuberance 23 is thermally deformed so that its distal end 23a is circular in profile by the guide portion 47, it is possible to trim the appearance of the main cartridge body unit 4 obtained on coupling the upper and lower cartridge halves 2, 3. The end face of the guide portion 47 is formed to the same height as the end face of the projection 45. The guide portion 47 may also be of lower height than the projection 45. That is, if the projection 45 is of a height larger than the guide portion 47, the recessed portion 23d formed in the protuberance 23 can be deeper to improve the thermal conduction efficiency to the protuberance 23.

In each thermal caulking head 42, formed as described above, there is enclosed a heater 48 for heating the thermal caulking head 42, as shown in FIG. 3. The heater 48 is connected via a connection line 51 to a power source transformer 49, which in turn is connected over a connection line 53 to a control mechanism 52 adapted for controlling the assembling device 30. When the thermal caulking head 42 is moved in a direction approaching to the protuberance 23, the power source transformer 49 furnishes the power to the heater 48, by the control mechanism 52, to heat the thermal caulking head 42 to a temperature capable of thermally deforming the protuberance 23 provided on the upper cartridge half 2.

To each thermal caulking head 42 is connected a cooling mechanism 54, adapted for cooling the thermal caulking head 42, as shown in FIG. 3. This cooling mechanism 54 includes an air supply unit 55, for supplying to the thermal caulking head 42 the cooling air as the cooling medium for cooling the heated thermal caulking head 42, and a control valve 56 arranged on an air supply unit 55 for controlling air supply to the thermal caulking head 42, and is connected to the thermal caulking head 42 via a connection pipe 57. The air supply unit 55 includes a control valve 56 connected to the control mechanism 52 via a connection line 58. The air supply unit 55 has the control valve 56 controlled by the control mechanism 52 so that cooling air is supplied to the thermal caulking head 42 only when the thermal caulking head 42 is moved in a direction away from the protuberance 23. The control valve 56 is formed as an electrically controllable electromagnetic valve.

This thermal caulking head 42 is supported by being inserted through an opening 44 formed in the mounting plate 43, as shown in FIG. 3. This mounting plate 43 is supported on a movement mechanism 61 for causing movement of the thermal caulking head 42 in a direction towards and away from the protuberance 23. This movement mechanism 61 includes an actuating plate 62 carrying the mounting plate 43, in turn mounting the thermal caulking head 42, for causing movement of the mounting plate 43, a driving unit 63 for causing movement of the actuating plate 62 and a guide plate 64 for guiding movement of the actuating plate 62. The actuating plate 62 is mounted on the guide plate 64 for movement under guidance by a guide 65 formed on the guide plate 64, so that the thermal caulking head 42 is moved towards and away from the protuberance 23, as indicated by arrows C and D in FIG. 3. The driving unit 63 is made up of a driving motor, a pneumatic cylinder, and so forth, and has its driving controlled by the control mechanism 52. That is, when the protuberance 23 is thermally deformed by the thermal caulking head 42, the driving unit 63 causes movement of the actuating plate 62 in a direction approaching to the protuberance 23 as indicated by arrow C in FIG. 3. On the other hand, when the thermal caulking head 42 is cooled, the driving unit 63 is moved in a direction away from the protuberance 23, as indicated by arrow D in FIG. 3.

Figure 5:
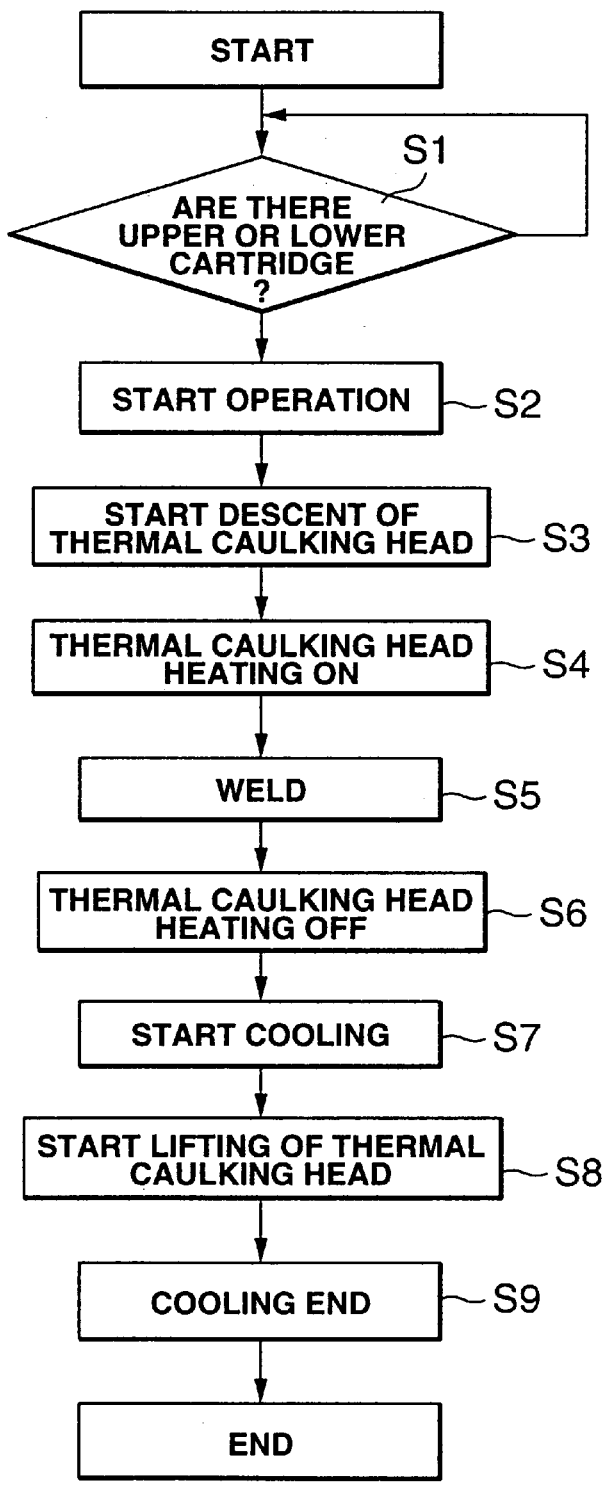
FIG. 5 is a process diagram for illustrating the process for caulking the lower cartridge half to the upper cartridge half.
Figure 6:
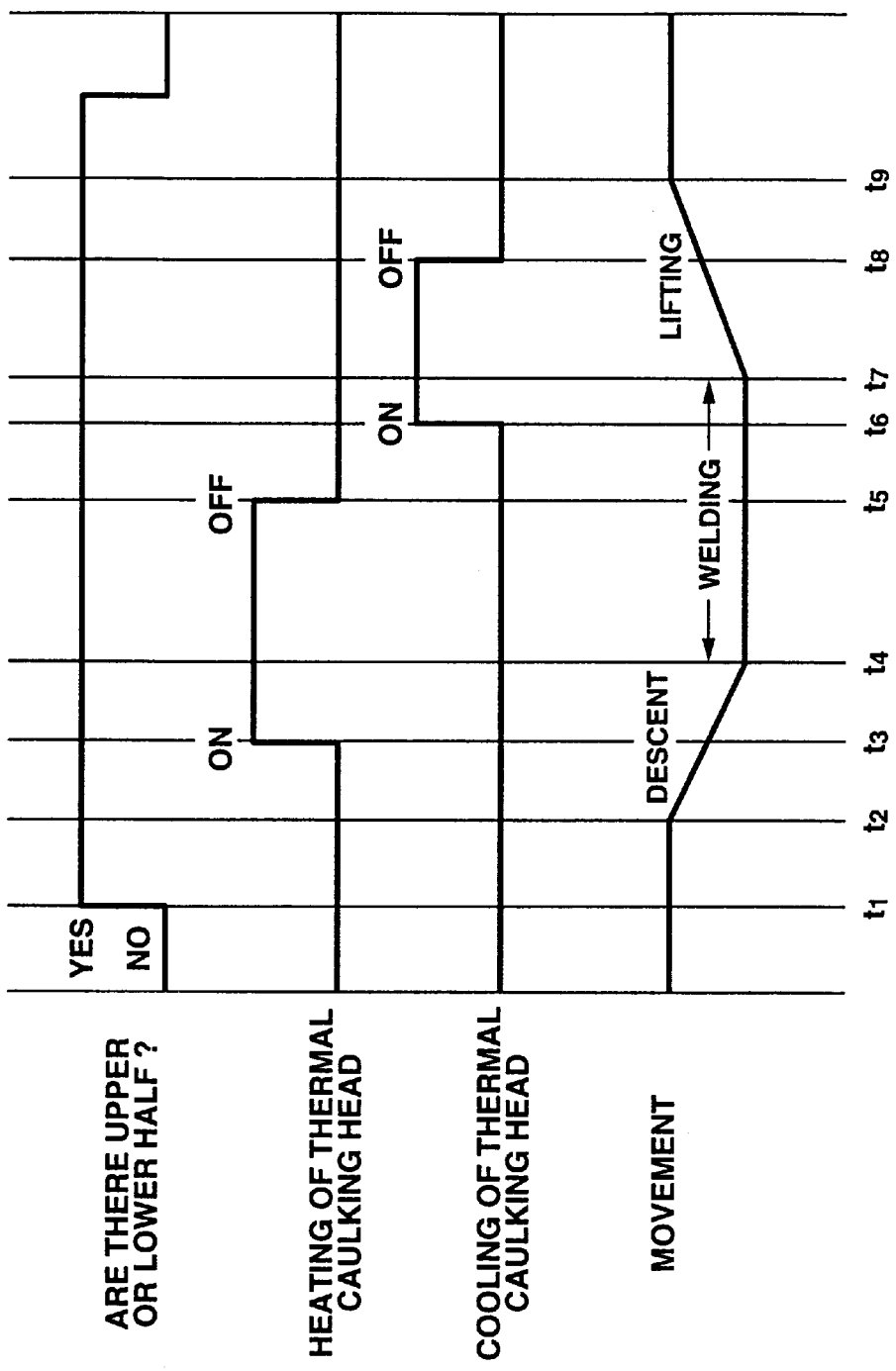
FIG. 6 is a timing chart for illustrating the heating, cooling and lifting of the thermal caulking head.

Referring to FIGS. 5 to 7, the operation of the assembling device 30 of the disc cartridge 1 is explained.

When the operation of the assembling device 30 is started, the assembling device 30 detects whether or not the upper and lower cartridge halves 2, 3 are held on the holding mechanism 31, at step S1 in the process diagram of FIG. 5, by a detection mechanism, not shown. When the detection mechanism detects that the upper and lower cartridge halves 2, 3 are held by the holding mechanism 31, the program moves to step S2 and, if otherwise, the program repeats the step S1. That is, at step S1, the heater 48 and the cooling mechanism 54 are in the off-state, as indicated at time t1 in FIG. 6, with the thermal caulking head 42 being spaced apart from the protuberance 23, as shown in FIG. 7A.

Figure 7A:
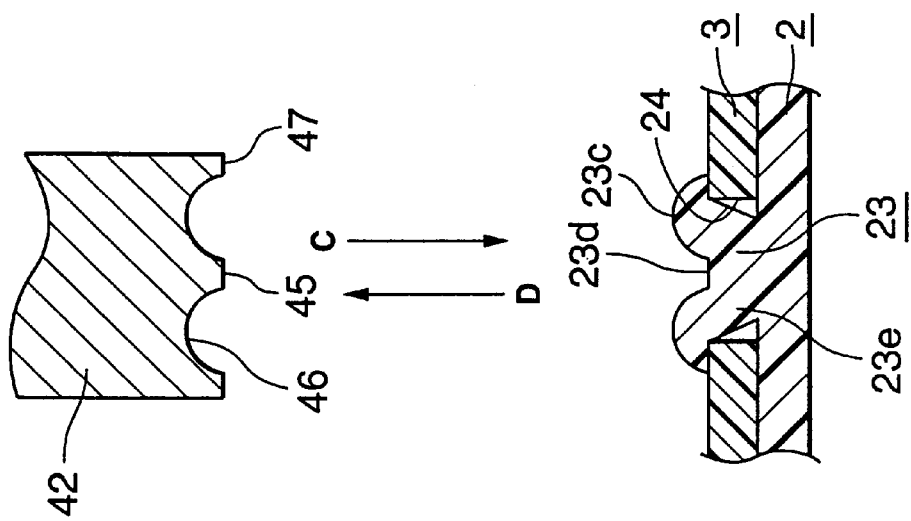

At step S2, the assembling device 30 is started and, at step S3, the thermal caulking head 42 starts to be lowered in a direction of approaching to the protuberance 23, as indicated by arrow C in FIGS.3 and 7(A). That is, at step S3, the thermal caulking head 42 starts to be lowered at time t2 in FIG. 6, with the heater 48 and the cooling mechanism 54 being in the off state.

At step S4, the thermal caulking head 42 starts to be heated. That is, as the thermal caulking head 42 is lowered, at time t3 in FIG. 6, the heater 48 is turned on to start the heating so that the protuberance 23 is heated to a thermal deformation enabling temperature. The cooling mechanism 54 is kept in an off-state.

Figure 7B:
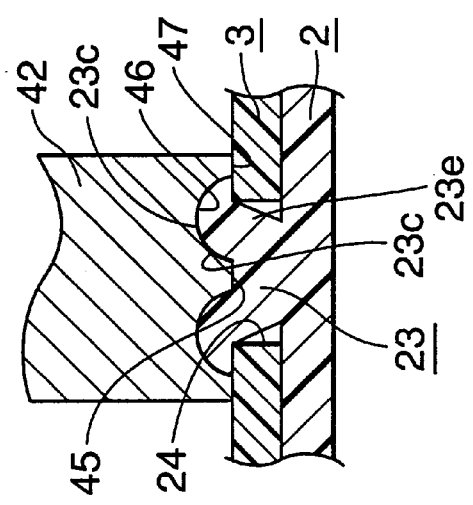
Figure 7C:
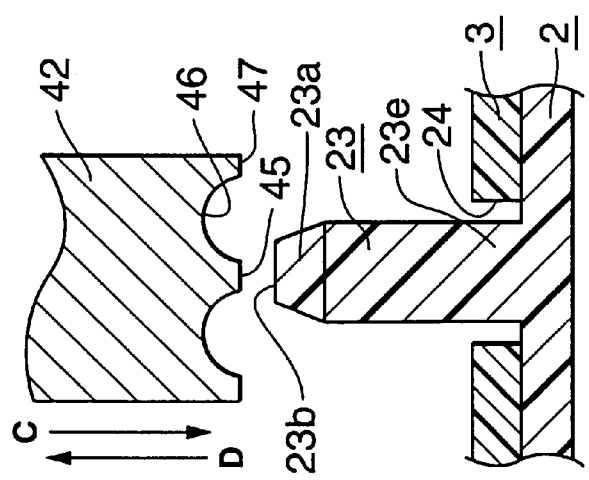

At step S5, the thermal caulking head 42 is lowered to its lowermost position, at time t4 in FIG. 6, so that the distal end 23a of the protuberance 23 starts to be thermally deformed. The thermal caulking head 42 thrusts and thermally deforms the protuberance 23, as shown in FIG. 7(B). Since the thermal caulking head 42 form the retainer 23c used for retaining the lower cartridge half 3, while there is provided the projection 45, there is formed the recessed portion 23d in the mid portion of the distal end face 23b of the protuberance 23. Since the projection 45 is formed on the thermal caulking head 42, the contact area between the thermal caulking head 42 and the protuberance 23 is enlarged to improve the thermal transmission efficiency from the thermal caulking head 42 to the protuberance 23 to shorten the time required for thermal caulking. Since the projection 45 nips into the bulk of the protuberance 23, the distal end 23e of the protuberance 23 is increased in diameter. By the distal end 23e of the protuberance 23 being increased in diameter, the protuberance 23 can be tightly fitted in the through-hole 24 of the lower cartridge half 3 to prevent play after coupling the upper and lower cartridge halves 2, 3 together.

Then, at step S6, the heater 48 of the thermal caulking head 42 is turned off to stop the heating. The heating of the thermal caulking head 42 is halted during thermal deformation of the protuberance 23 at time t5 in FIG. 6. At step S7, the cooling mechanism 54 is turned on. The thermal caulking bead 42 halts heating and start cooling during thermal deformation of the protuberance 23 at time t5 and time t6 in FIG. 6 to shorten the time required for thermal caulking.

Then, at step S8, the thermal caulking head 42 starts its movement in a direction away from the protuberance 23 as indicated by arrow D in FIGS.3 and 7(C). At this step S8, the thermal caulking head 42 starts to be lifted, with the heater 48 off and with the cooling mechanism 54 on, at time t7 in FIG. 6. At step S9, the cooling mechanism 54 halts cooling of the thermal caulking head 42 at time t8 in FIG. 6 to complete the cooling of the thermal caulking head 42, as the thermal caulking head 42 is uplifted. The thermal caulking head 42 is spaced from the protuberance 23, at time t9 in FIG. 6, as shown in FIG. 7(C), to complete the thermal caulking step. That is, the lower cartridge half 3 is retained by the retainer 23c around the through-hole 24, so as to be coupled to the upper cartridge half 2, with the proximal end 23e of the protuberance 23 being increased in diameter to eliminate the gap between the through-hole 24 and the protuberance 23 to prevent play. This completes assemblage of the main cartridge body unit 4.

After the end of the coupling process of the upper and lower cartridge halves 2, 3 and the assemblage of the upper and lower cartridge halves 2, 3, the shutter member 18 adapted for opening/closing the first and second recording and/or reproducing apertures 16, 17 is fitted from the front side of the main cartridge body unit 4, and a torsion coil spring 20 adapted for biasing the shutter member 18 is mounted in a direction of closing the first and second recording and/or reproducing apertures 16, 17 to complete the assemblage of the disc cartridge 1 housing the magnetic disc 5 therein.

With the above-described assembling device 30 for the disc cartridge 1, since the projection 45 increasing the contact area with the protuberance 23 thermally deformed by the thermal caulking head 42 is formed, the thermal transmission efficiency to the protuberance 23 can be improved to shorten the thermal deformation time for the protuberance 23. On the other hand, the projection 45 provided on the thermal caulking head 42 nips into the bulk of the protuberance 23, the proximal end 23e of the protuberance 23 is enlarged in diameter to eliminate the gap formed between the protuberance 23 and the through-hole 24 in the lower cartridge half 3 to prevent the play after coupling the upper and lower cartridge halves 2, 3. Since the thermal caulking head 42 is provided with the guide portion 47 for trimming the distal end 23a of the thermally deformed protuberance 23 to a circular profile, the protuberance 23 facing the outside of the main cartridge body unit 4 is trimmed in profile to prevent impairment of the appearance of the entire disc cartridge 1.

An embodiment of the thermal caulking mechanism, which enables efficient coupling of the upper and lower cartridge halves 2, 3 using the above-described assembling device 30, is hereinafter explained.

Figure 8:
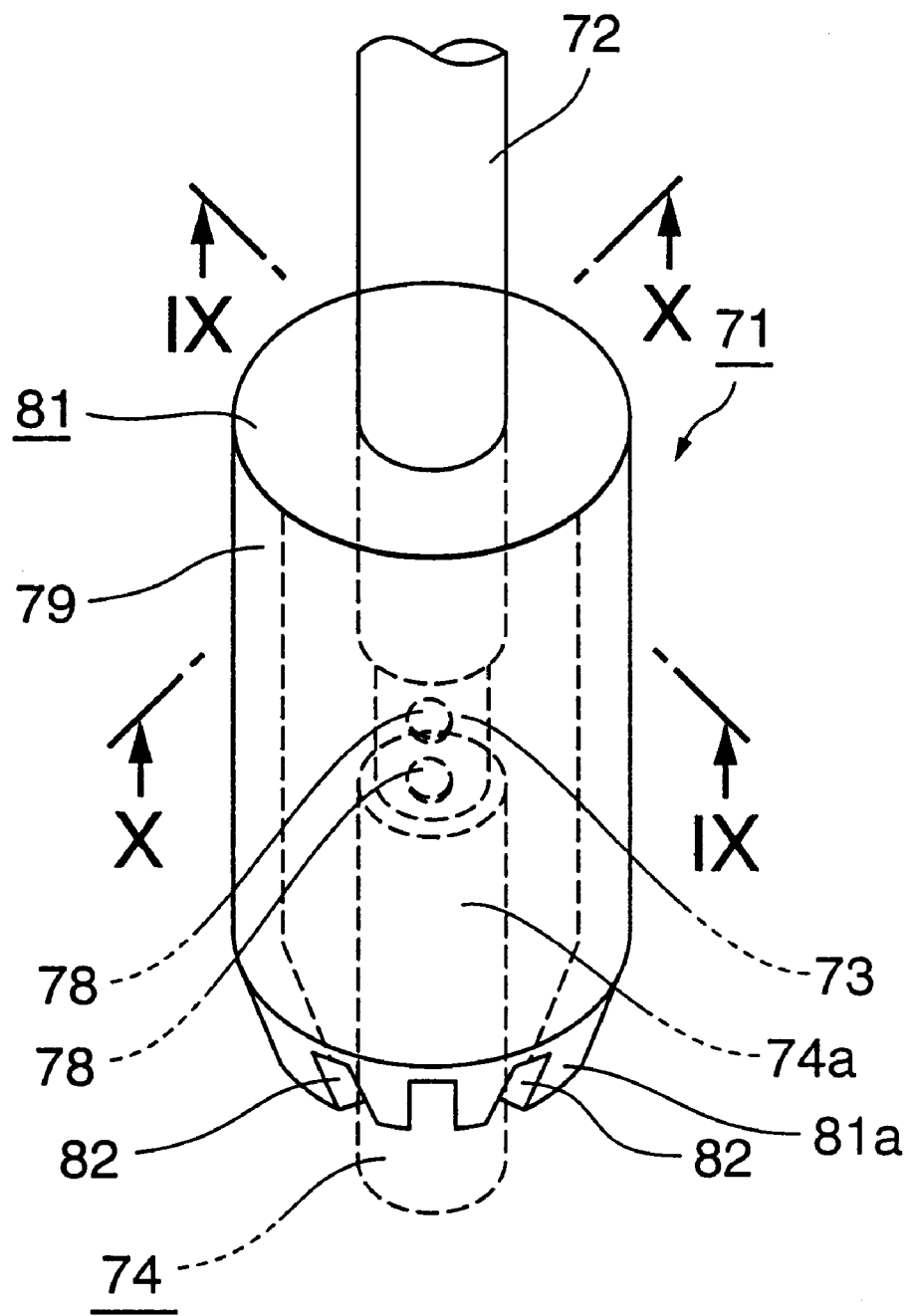
FIG. 8 is a perspective view showing a thermal caulking head mechanism constituting an assembling device according to the present invention.

Referring to FIG. 8, a thermal caulking head 74 is coupled via a hollow tubular coupling tube 73 to the distal end of a tubular air supplying pipe 72 which is used simultaneously as a supporting pillar which is connected to the air supply unit 55 via a connection pipe 57 and which is supported on the mounting plate 43 (FIG. 3).

Figure 9:
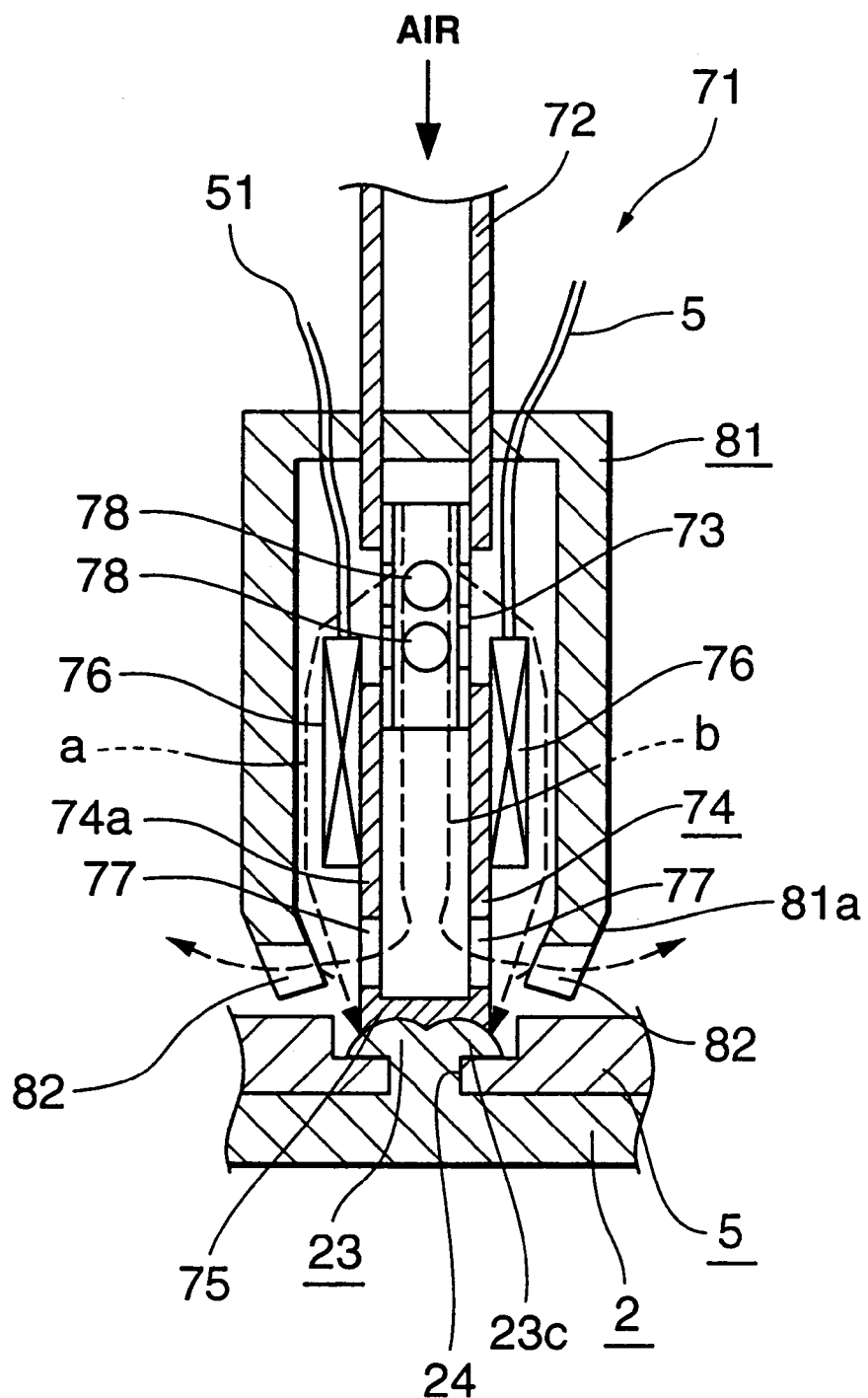
FIG. 9 is a cross-sectional view taken along line IX—IX of FIG. 8 for illustrating the state of thermal caulking of the upper and lower cartridge halves by the thermal caulking head mechanism.
Figure 10:
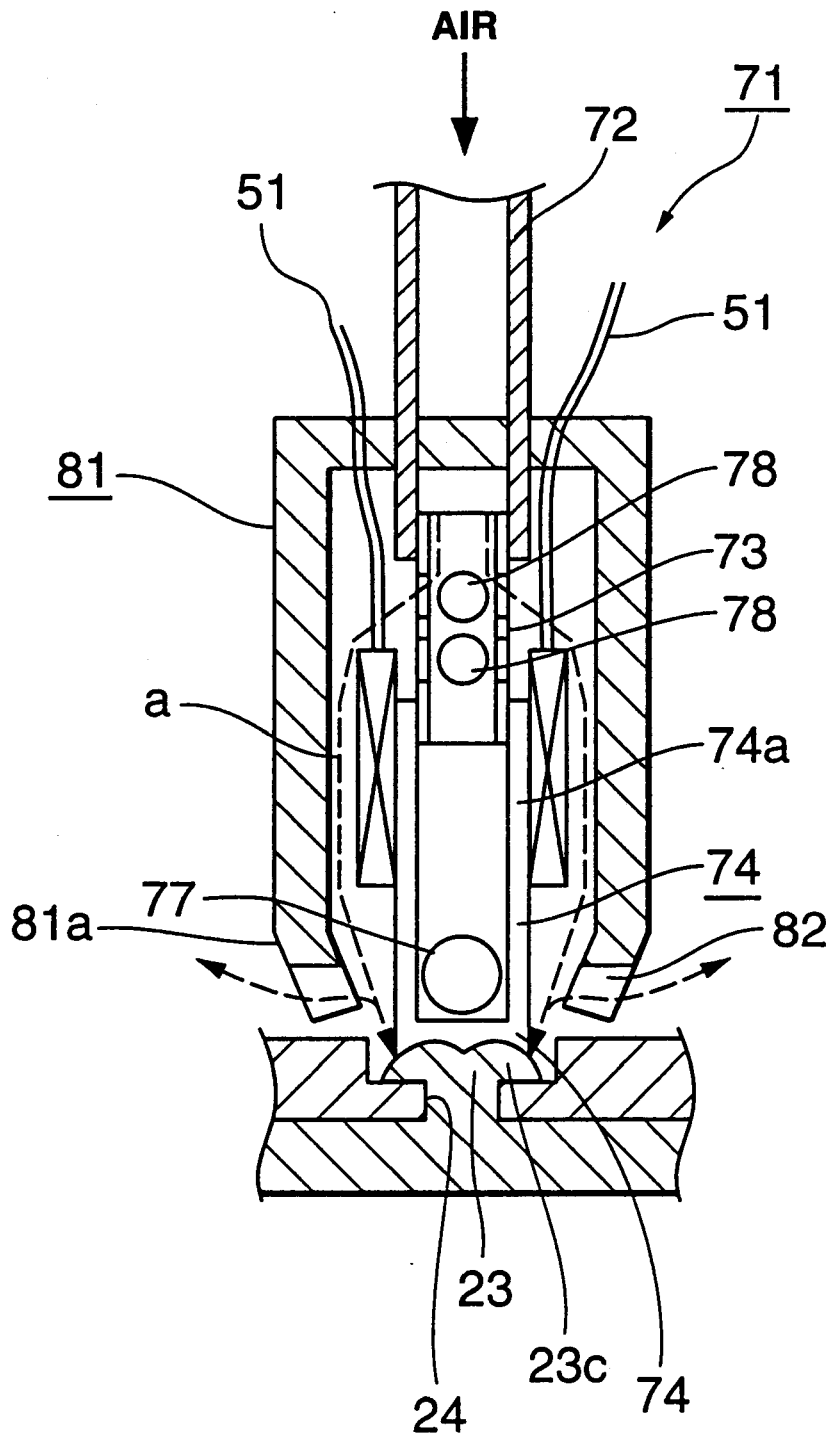
FIG. 10 is a cross-sectional view taken long line X—X in FIG. 8 for illustrating the state of thermal caulking of the upper and lower cartridge halves by the thermal caulking head mechanism.

Referring to FIGS.9 and 10, the thermal caulking head 74 includes a hollow tubular main head member 74a, and a head chip 75 having the above-mentioned projection 45, recessed portion 46 and the guide portion 47 is provided for closing the distal end of the main head member 74a. On the outer rim of the main head member 74a is mounted a heater 76 for heating the head chip 75. This heater 76 is connected via the connection line 51 to the power source transformer 49, as mentioned above. This thermal caulking head 74 is connected to an air supply pipe 72 via a connection pipe 73 inserted between the proximal end of the main head member 74a and the distal end of the air supply pipe 57. The connection pipe 73 is formed of a heat insulating material, such as ceramics, to prevent the heat of the thermal caulking head 74 heated by the heater 76 from being transmitted to the air supply pipe 72.

Since the thermal caulking head 74 (73) is hollow and is connected via the hollow connection pipe 73 to the air supply pipe 72, the thermal caulking head 74 (73) is supplied with air, as the cooling medium, from the air supply unit 55. In the lateral surface of the distal end of the thermal caulking head 73 is an air jet opening 77 for jetting air from the air supply unit 55 to around the protuberance 23 to be thermally caulked. A pair of the air jet openings 77 are provided in the peripheral surface of the main head member 74a for facing each other.

In the connection pipe 73 are also formed plural air jet openings 78 for jetting air from the air supply unit 55 to the outer periphery of the thermal caulking head 73. These air jet openings 78 are bored above and below the connection pipe 73.

An air guide tube 81, adapted for guiding the flowing direction of air jetted from the airjet openings 78 provided in the connection pipe 73 and from the air jet openings 77 provided in the thermal caulking head 73, is provided for extending from the distal end of the air supply pipe 72 to the vicinity of the distal end of the thermal caulking head 73. Referring to FIGS.9 and 10, this air guide tube 81 is tubular, with its proximal end attached to the air supply pipe 72 being closed and with its distal end being opened, and is tapered towards its distal end, so that the air jetted from the air jet openings 78 will be concentrated on the distal end of the thermal caulking head 73. The perimetrical portion of the distal end 81a of the air guide tube 81 is formed with radially extending air guide grooves 82 operating as air blowout ports. By providing the air guide grooves 82 in this manner, the air jetted into the air guide tube 81 is circulated along the surfaces of the upper and lower cartridge halves 2, 3, coupled to each other, as indicated by arrows in FIGS.9 and 10, to cool the portions of a thermal caulking site.

By jetting the cooling air from the air supply unit 55 to the interior of the thermal caulking head 73 and to the near-by portions, and by circulating the air along the surfaces of the upper and lower cartridge halves 2, 3 to be thermally caulked, the thermal caulking head 73 and the upper and lower cartridge halves 2, 3 to be thermally caulked can be cooled in a shorter time to expedite the cooling and solidification of the thermally deformed protuberances 23 to complete the assembling of the upper and lower cartridge halves 2, 3 in a shorter time.

Meanwhile, the air guide tube 81 for guiding the cooling air is suitably selected depending on the size of the protuberances 23 to be thermally caulked and on the shape of the upper and lower cartridge halves 2, 3 provided with the protuberances 23. The shape or the size of the air guide grooves 82 provided on the air guide tube 81 for guiding the air circulating direction can be suitably selected in meeting with the shape or the size of the area to be cooled.

The disc cartridge assembling device according to the present invention is applicable not only to the assemblage of the disc cartridge as described above, but to the assemblage of disc cartridges having a larger number of protuberances on the upper cartridge half 2, or to the assemblage of a cartridge for housing an optical disc or other discs.

The disc cartridge assembling device according to the present invention is designed to thermally deform the protuberances provided on one of the cartridge halves by a thermal caulking head having a recessed portion, the protuberances can be thermally deformed via a broader contact surface so that the protuberances can be thermally deformed in a shorter time. Moreover, the thermal caulking head is cooled by the cooling mechanism when the thermal caulking head is moved away from the thermally deformed protuberances, thus further shortening the time since thermal deformation until cooling. Since the time suffices since thermal deformation by the thermal caulking head until cooling, it is possible to shorten the step of interconnecting the upper and lower cartridge halves and the disc cartridge assembling process.

What is claimed is:

1. A disc cartridge assembling apparatus in which a protuberance formed on the inner surface of one of cartridge halves of a thermoplastic resin making up a main cartridge body unit is passed through a through-hole formed in the other cartridge half in register with said protuberance and in which a distal end of said protuberance is thermally deformed to interconnect said cartridge halves, comprising:
   a holding mechanism for holding said cartridge halves so that, with the cartridge half formed with said protuberance being placed below the other cartridge half, said other cartridge half being mounted on said cartridge half formed with said protuberance by passing said protuberance through said through-hole and for holding said upper and lower cartridge halves together;
   a caulking head having a recess on a surface thereof abutted against said protuberance, said caulking head enclosing a heating mechanism, said caulking head being adapted to compress against the distal end of said protuberance of said cartridge half exposed through said through-hole of said other cartridge half;
   a movement mechanism for thrusting said caulking head, heated to a temperature capable of thermally deforming said thermoplastic resin, against the distal end of said protuberance to deform said protuberance and for moving said caulking head away from said protuberance; and
   a cooling mechanism for cooling said caulking head.

2. The disc cartridge assembling apparatus according to claim 1 wherein said caulking head has a projection within said recess adapted for compressing against said protuberance.

3. The disc cartridge assembling apparatus according to claim 2 wherein said protuberance is formed at the center of said recess.

4. The disc cartridge assembling apparatus according to claim 1 wherein said cooling mechanism cools said caulking head when the caulking head is moved away from said protuberance.

5. The disc cartridge assembling apparatus according to claim 1 wherein said cooling mechanism cools said caulking head when the caulking head cools said caulking bead and a caulked portion of said main cartridge body unit.

6. The disc cartridge assembling apparatus according to claim 5 wherein said cooling mechanism has a fluid duct in said caulking head and a blowout port towards said caulked portion and wherein a gaseous cooling medium is circulated from said flow duct towards said blowout port.

* * * * *

UNITED STATES PATENT AND TRADEMARK OFFICE
CERTIFICATE OF CORRECTION

PATENT NO. : 6,298,533 B1  Page 1 of 1
DATED : October 9, 2001
INVENTOR(S) : Kimitaka Nishimura et al.

It is certified that error appears in the above-identified patent and that said Letters Patent is hereby corrected as shown below:

<u>Title page,</u>
Item [57], ABSTRACT, lines 5 and 6, replace "the protuberance" with -- said protuberance --.

Signed and Sealed this

Twenty-sixth Day of March, 2002

Attest:

JAMES E. ROGAN
*Attesting Officer*  *Director of the United States Patent and Trademark Office*